United States Patent Office 3,144,444
Patented Aug. 11, 1964

3,144,444
NOVEL DERIVATIVES OF 6-AMINO-
PENICILLANIC ACID
Billie Kenneth Koe, Gales Ferry, Conn., assignor to Chas.
Pfizer & Co., Inc., New York, N.Y., a corporation of
Delaware
No Drawing. Filed Sept. 27, 1960, Ser. No. 58,633
10 Claims. (Cl. 260—239.1)

This invention relates to new antibiotic compounds and their salts and, more particularly, to novel 6-aminopenicillanic acid derivatives and their salts which exhibit antagonism toward the antibiotic resistant Staphylococci and resistance to penicillinase.

The term "penicillin" includes a number of acyl derivatives of 6-aminopenicillanic acid which differ only in the nature of the R group and possess the general formula:

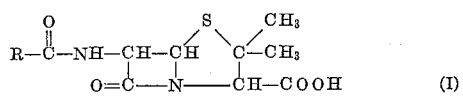

(I)

in which the acyl moiety is derived from a hydrocarbon carboxylic acid.

The properties of a particular penicillin are determined by the R group. The best known and most widely used penicillins are benzylpenicillin and phenoxymethylpenicillin wherein R (Formula I) represents the benzyl- and phenoxy-methyl-radicals. Both compounds are effective via both parenteral and oral administration in the treatment of bacterial infections due to gram-positive organisms but are generally ineffective against gram-negative organisms, many of which are resistant to their action, and penicillinase producing strains of bacteria, such as *Escherichia coli, Bacillus subtilis, Bacillus cereus* and various Staphylococci strains. The penicillinases produced by these bacteria antagonize the antibacterial activity of the penicillin compound by hydrolysis of the beta lactam linkage to produce the biologically and antigenically inactive penicilloic acid. It is believed to be a prominent factor in penicillin resistance of bacteria.

There has now been discovered a series of novel and valuable derivatives of 6-aminopenicillanic acid which exhibit resistance to the effect of penicillinases and are, therefore, of value in the treatment of bacterial infections due to penicillinase-producing organisms resistant to the presently available penicillins and which possess significant activity against gram positive organisms. The novel compounds of this invention present a complete structural departure from the heretofore known penicillin antibiotics in having a direct nitrogen to phosphorous linkage in place of the carbonyl group of the presently available penicillins. They have, in the acid form, the Formula II:

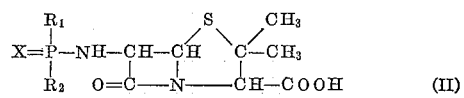

(II)

wherein X is selected from the group consisting of oxygen and sulfur; $R_1$ is selected from the group consisting of cyclohexyl, phenoxymethyl, phenylmercaptomethyl, alkyl containing 1 to 8 carbon atoms, substituted akyl wherein the substituent is selected from the group consisting of chloro, bromo, nitro and alkoxy containing 1 to 4 carbon atoms; allyl, benzyl, phenyl, substituted phenyl wherein the substituent is selected from the group consisting of chloro, bromo, nitro, alkoxy containing 1 to 4 carbon atoms and alkyl containing 1 to 4 carbon atoms; $R_2$ is selected from the group consisting of $R_1$ and $YR_3$ wherein Y is selected from the group consisting of oxygen and sulfur; $R_3$ is selected from the group consisting of allyl, benzyl, phenyl, substituted phenyl wherein the substituent is selected from the group consisting of chloro, bromo, nitro, alkoxy containing 1 to 4 carbon atoms and alkyl containing 1 to 4 carbon atoms; alkyl containing 1 to 8 carbon atoms and substituted alkyl wherein the substituent is selected from the group consisting of chloro, bromo, nitro and alkoxy containing 1 to 4 carbon atoms.

The new antibiotics can be named by reference to the 6-aminopenicillanic acid moiety or the phosphorous containing moiety as the parent compound. Thus, for example, when considered as derivatives of 6-aminopenicillanic acid, the antibiotic wherein $R_1$ is phenyl, $R_2$ is ethoxy and X is oxygen is named 6-[(O-ethyl)benzenephosphonamido]penicillanic acid. The same compound, when considered as an amidophosphonic acid, is named N-[(6-penicillanyl)amido](O-ethyl)benzenephosphonic acid. It is preferred to name them as derivatives of penicillanic acid since this system of nomenclature, at one and the same time, points up their structural similarity and dissimilarity to the penicillins.

Included in the present invention are the pharmaceutically acceptable salts of these novel penicillins, that is, non-toxic metal salts such as the sodium, calcium and potassium salts and, non-toxic ammonium and substituted ammonium salts, for example, salts of such non-toxic amines as procaine, dibenzylamine, N,N'-dibenzylethylenediamine, 1-ephenamine, N-benzyl-β-phenethylamine and other amines which have been used to form salts with benzylpenicillin.

As mentioned previously, the novel products of this invention are unexpectedly resistant to penicillinase and exhibit significant antagonism toward organisms resistant to the heretofore available penicillins. In addition, they also demonstrate antagonism toward gram-positive and gram-negative organisms although the activity towards the former class is somewhat lower than that of phenoxymethylpenicillin. The in vivo antibacterial spectrum of several of the valuable products of this invention versus a number of gram-positive and gram-negative organisms is compared with that of phenoxymethylpenicillin in Table I. The compounds are used as their potassium salts. The minimum inhibitory concentrations (MIC) are expressed in mcg./ml.

TABLE I.—ANTIBACTERIAL SPECTRA OF SEVERAL COMPOUNDS OF FORMULA II AND OF PHENOXYMETHYLPENICILLIN AS THEIR POTASSIUM SALTS

| Microorganism | 1 | 2 | 3 | 4 | 5 | 6 | 7 | 8 | 9 | 10 |
|---|---|---|---|---|---|---|---|---|---|---|
| Staphylococcus aureus | 0.78 | 1.56 | 0.78 | 0.78 | 6.25 | 1.56 | 1.56 | 0.39 | 3.12 | 0.0312 |
| Staphylococcus aureus 376 | 1.56 | 3.12 | 3.12 | 3.12 | 12.5 | 3.12 | 100 | 3.12 | 25 | >100 |
| Staphylococcus aureus 400 | 3.12 | 3.12 | 3.12 | 3.12 | 12.5 | 3.12 | 12.5 | 3.12 | 25 | >100 |
| Streptococcus pyogenes | 0.19 | 0.09 | <0.19 | 0.09 | 0.39 | 0.39 | 0.19 | <0.19 | 0.19 | 0.0156 |
| Streptococcus faecalis | 12.5 | 12.5 | >100 | 6.25 | 12.5 | 50 | 12.5 |  | 12.5 | 0.156 |
| Diplococcus pneumoniae | 12.5 | 25 | >100 | 6.25 | 12.5 | 25 | 100 | 25 | 12.5 | 0.156 |
| Erysipelothrix rhusiopathiae | 1.56 | 0.78 | 0.78 | 1.56 | 0.39 | 0.78 | 0.78 |  | 0.78 |  |
| Corynebacterium diphtheriae | 0.78 | 0.39 | 0.78 | 0.78 | 3.12 | 0.78 | 1.56 |  | 0.19 | 0.78 |
| Listeria monocytogenes | 25 | 25 | 50 | 25 | 25 | 50 | 25 | 3.12 | 50 | 6.25 |
| Bacillus subtilis | 12.5 | 3.12 | 1.56 | 1.56 | 3.12 | 6.25 | 3.12 |  | 1.56 | 0.019 |
| Streptococcus agalactiae | 0.78 | 0.39 | 0.39 | 0.39 | 0.78 | 0.19 | 1.56 | 0.39 | 0.39 | 0.039 |
| Lactobacillus casei |  | 12.5 | 12.5 | 6.25 | 25 | 12.5 | 25 |  | 50 | 1.56 |
| Bacterium ammoniagenes | 12.5 | 6.25 | 12.5 | 3.12 | 6.25 | 3.12 | 0.78 |  | 6.25 | 0.039 |
| Aerobacter aerogenes | >100 | >100 | >100 | >100 | >100 | >100 | >100 | >100 | >100 | >100 |
| Escherichia coli | >100 | >100 | >100 | >100 | >100 | 50 | >100 | 100 | >100 | >100 |
| Proteus vulgaris | <100 | >100 | >100 | >100 | >100 | >100 | >100 | >100 | >100 | >100 |
| Pseudomonas aeruginosa | >100 | >100 | >100 | >100 | >100 | >100 | >100 | >100 | >100 | >100 |
| Salmonella typhosa | >100 | >100 | >100 | >100 | 25 | >100 | 50 | >100 | >100 | >100 |
| Salmonella gallinarum | 100 | >100 | >100 | >100 | 12.5 | >100 | 50 |  | >100 | >100 |
| Salmonella pullorum | >100 | >100 | >100 | >100 | >100 | >100 | 50 |  | >100 | >100 |
| Klebsiella pneumoniae | >100 | >100 | >100 | >100 | >100 | >100 | 100 | 100 | >010 | 100 |
| Neisseria gonorrhea | 12.5 | 12.5 | >100 | 6.25 | 12.5 | 25 | 3.12 | 12.5 | 50 |  |
| Hemophilus pertussis | >100 | >100 | 12.5 | 25 | 6.25 | 50 | 3.12 | 100 | 12.5 | 12.5 |
| Shigella sonnei | >100 | >100 | >100 | >100 | >100 | >100 | 100 pi |  | >100 | >100 |
| Brucella bronchiseptica | >100 | >100 | >100 | >100 | >100 | >100 | >100 |  | >100 | >100 |
| Malleomyces mallei | >100 | >100 | >100 | >100 | >100 | >100 | >100 |  | >100 | >100 |
| Vibrio comma | >100 | >100 | >100 | >100 | 25 | 100 | 100 |  | 50 | 12.5 |
| Pasteurella multocida | >100 | 1.56 | 25 | 5.25 | 3.12 | 50 | 3.12 | 0.39 | 3.12 | 0.39 |
| Candida albicans | >100 |  | >100 | >100 | >100 | >100 | >100 |  | >100 | >100 |
| Sarcina lutea | >100 | 0.78 | <0.19 | 0.09 | 0.39 | <0.19 | 0.19 |  | 0.39 |  |
| Staphylococcus aureus serum | 25 | 12.5 | 3.12 | 6.25 | 12.5 | 50 | 50 | 12.5 | 3.12 |  |
| Streptococcus pyogenes serum | 6.25 | 6.25 | 0.39 | 0.78 | 1.56 | 25 | 0.78 | 0.39 | 0.78 |  |
| Mycobacterium 607 | 100 | >100 | >100 | >100 | >100 | >100 | >100 | >100 | >100 |  |
| Mycobacterium berolinense | 100 | >100 | >100 | >100 | >100 | >100 | >100 | >100 | >100 | 100 |

TABLE II.—IDENTIFICATION OF COMPOUNDS OF TABLE I

| No. | Penicillanic Acid | X | $R_1$ | $R_2$ | Y | $R_3$ |
|---|---|---|---|---|---|---|
| 1 | 6-(O-n-butyl)-benzenethionophosphonamido | S | $C_6H_5$ | $YR_3$ | O | $n-C_4H_9$ |
| 2 | 6-(O-2-chloroethyl)-benzenethionophosphonamido | S | $C_6H_5$ | $YR_3$ | O | $ClCH_2-CH_2$ |
| 3 | 6-(O-phenyl)-benzenephosphonamido | O | $C_6H_5$ | $YR_3$ | O | $C_6H_5$ |
| 4 | 6-(O-o-tolyl)-benzenephosphonamido | O | $C_6H_5$ | $YR_3$ | O | $O-(CH_3)C_6H_4$ |
| 5 | 6-(O-ethyl)isopropanephosphonamido | O | $i-C_3H_7$ | $YR_3$ | O | $C_2H_5$ |
| 6 | 6-(O-o-chlorophenyl)-benzenethionophosphonamido | S | $C_6H_5$ | $YR_3$ | O | $o-ClC_6H_4$ |
| 7 | 6-(O-p-methoxyphenyl)-benzenephosphonamido | O | $C_6H_5$ | $YR_3$ | O | $p-(CH_3O)C_3H_4$ |
| 8 | 6-(S-ethyl)benzenethionophosphonamido | S | $C_6H_5$ | $YR_3$ | S | $C_2H_5$ |
| 9 | 6-(diethyl)-thionophosphonamido | S | $C_2H_5$ | $C_2H_5$ |  |  |
| 10 | Phenoxyacetamido |  |  |  |  |  |

It should be noted that antagonism toward gram negative microorganisms is exhibited by many of the compounds of this invention although their principle antagonism is toward the gram positive microorganisms.

The therapeutic value of these compounds is evident on consideration of their in vitro activity against antibiotic resistant S. aureus microorganisms. The minimum inhibitory concentrations of several of these valuable products, as their potassium salts, against resistant S. aureus are reported in Table III in terms of mcg./ml.

The valuable products of this invention are, therefore, remarkably effective in treating a number of gram-positive, gram-negative and pencillin resistant infections in animals including man. For this purpose, the pure materials or mixtures thereof with other antibiotics can be employed. They may be administered alone or in combination with a pharmaceutical carrier selected on the basis of the chosen route of administration and standard pharmaceutical practice. For example, they may be administered orally in the form of tablets containing such

TABLE III.—ACTIVITY AGAINST RESISTANT STAPHYLOCOCCI

| Penicillin | X | $R_1$ | $R_2$ | Y | $R_3$ | 5 | 376 | 400 | $K_3$ | $K_4$ | MI | M2 | M12 | M13 |
|---|---|---|---|---|---|---|---|---|---|---|---|---|---|---|
| 6-(O-m-tolyl)-benzenephosphonamido | O | $C_6H_5$ | $YR_3$ | O | $m-(CH_3)C_6H_4$ | 1.56 | 6.25 | 3.12 | 3.12 | 3.12 | 3.12 | 3.12 | 3.12 | 3.12 |
| 6-(O-phenyl)-benzenephosphonamido | O | $C_6H_5$ | $YR_3$ | O | $C_6H_5$ | 0.78 | 3.12 | 3.12 | 3.12 | 3.12 | 3.12 | 1.56 | 3.12 | 1.56 |
| 6-(O-o-tolyl)-benzenephosphonamido | O | $C_6H_5$ | $YR_3$ | O | $-o(CH_3)C_6H_4$ | 1.56 | 6.25 | 6.25 | 6.25 | 6.25 | 3.12 | 3.12 | 3.12 | 3.12 |
| 6-(O-phenyl)-benzenethionophosphonamido | S | $C_6H_5$ | $YR_3$ | O | $C_6H_5$ | 0.19 | 0.78 | 0.78 | 0.78 | 0.78 | 0.78 | 0.78 | 0.78 | 0.78 |
| 6-(O-p-methoxyphenyl)benzenephosphonamido | O | $C_6H_5$ | $YR_3$ | O | $p-(CH_3O)C_6H_4$ | 3.12 | 3.12 | 3.12 | 3.12 | 3.12 | 3.12 | 3.12 | 3.12 | 6.25 |
| 6-(O-n-butyl)benzenephosphonamido | O | $C_6H_5$ | $YR_2$ | O | $n-C_4H_9$ | 0.78 | 3.12 | 1.56 | 1.56 | 1.56 | 1.56 | 1.56 | 1.56 | 1.56 |
| 6-(O-ethyl)benzenethionophosphonamido | S | $C_6H_5$ | $YR_3$ | O | $C_2H_5$ | 0.78 | 1.56 | 1.56 | 3.12 | 1.56 | 1.56 | 1.56 | 1.56 | 1.56 |
| 6-(O-o-chlorophenyl)benzenephosphonamido | O | $C_6H_5$ | $YR_3$ | O | $o-ClC_6H_4$ | 1.56 | 3.12 | 3.12 | 3.12 | 3.12 | 3.12 | 3.12 | 3.12 | 3.12 | excipients as starch, milk sugar, certain types of clay, etc., or incapsules alone or in admixture with the same or equivalent excipients. They may also be administered orally in the form of elixirs or oral suspensions which may contain flavoring or coloring agents or be injected parenterally, that is, for example, intramuscularly or subcutaneously. For parenteral administration they are best used in the form of a sterile aqueous solution which may contain other solutes, for example, enough saline or glucose to make the solution isotonic. The particular regimen and dosage adopted will be assessed by the physician according to the age, weight and condition of the patient. In general, however, the dosage will be approximately the same order of magnitude as in used in the case of phenoxymethylpenicillin treatment of gram-positive infections.

The new and valuable compounds of the present invention are prepared by the reaction of 6-aminopenicillanic acid with (1) the appropriate phosphonyl halide, e.g. $R_1R_2P(X)$ halogen wherein $R_1$, $R_2$ and X are as previously defined and halogen is chloro or bromo, in the presence of an acid acceptor at a pH value of from about 3 to about 9 and at a temperature of from about 0° C. to about 50° C.; (2) or with the appropriate phosphonic acid mono ester or secondary phosphonic acid e.g. $R_1R_2P(X)OH$, in the presence of a condensing agent, such as 1,3-dicyclohexylcarbodiimide at a pH of from about 5 to about 8 and at a temperature of from about 0° C. to about 100° C. in a suitable solvent such as tetrahydrofuran, acetonitrile, water.

They can also be prepared by the method of Sheehan et al., Journal of the American Chemical Society, 81, 3089 (1959) which utilizes the reaction of D-penicillamine and t-butylphthalimidomalonaldehydate as starting materials for a series of reactions. Substitution of the phenoxyacetyl chloride utilized by Sheehan et al., by, for example (O-ethyl)benzenephosphonyl chloride, in the reaction sequence produces 6-[(O-ethyl)benzenephosphonamido]penicillanic acid potassium salt.

It is preferred to utilize the reaction of 6-aminopenicillanic acid with the appropriate phosphonyl halide since this method produces substantial yields of the desired product.

When prepared in this manner the novel antibiotics are obtained as the sodium or potassium salts. They are readily converted to the acid form by acidification with a mineral acid, such as sulfuric or hydrochloric acids, or a suitable ion exchange resin and are recovered by extraction of their aqueous solution with a suitable water-immiscible solvent.

The acid forms of the novel antibiotics of the present invention are, in turn, easily converted to salts by reaction with a suitable base. Thus, treatment of the desired antibiotic in aqueous solution with ammonium hydroxide produces the ammonium salt. In like manner other salts such as the calcium, magnesium, barium, potassium and sodium, are formed. In addition, amine salts, such as the procaine, dibenzylamine, N,N'-dibenzylethylenediamine, 1-ephenamine and N-benzyl-$\beta$-phenethylamine salts, are prepared by reacting a solution of the desired antibiotic in an aqueous or non-aqueous solvent with the desired amine. Alternatively, the amine salts are prepared in aqueous solution by reacting a metal salt of the desired antibiotic, e.g. the sodium salt, with the desired amine acid salt, for example, the amine hydrochloride salt.

The necessary starting phosphonyl and thiophosphonyl halides are available by methods described by Kosolapoff, "Organophosphorous Compounds," J. Wiley and Sons, Inc., N.Y., 1950, Ch. 4; for example, by the semi-esterification of the corresponding phosphonyl dichloride with the proper sodium alkoxide in a reaction inert solvent or with the proper alcohol or phenol and pyridine in an inert medium.

In addition to the compounds described above, all of which contain pentavalent phosphorus, related compounds containing trivalent phosphorous, for example a group of the formula $R_2R_2P$— wherein the $R_2$ groups are as previously defined and may be alike or different, attached to the amino group of 6-aminopenicillanic acid demonstrate properties similar to the compounds of this invention and are isotelic with the compounds of this invention.

The following examples are provided to further illustrate in detail methods for the procedure of the present invention. They are, however, not to be construed as limiting the invention in anyway.

*Example I*

A solution of 8.97 g. of (O-p-methoxyphenyl)benzenethionophosphonyl chloride in 45 ml. acetone is added slowly to a solution of 6.48 g. of 6-aminopenicillanic acid and 6.0 g. potassium bicarbonate in 45 ml. water. The solution (pH 8) is adjusted to pH 6 by the addition of solid 6-aminopenicillanic acid and is agitated for 5 hrs. The reaction mixture is then clarified by filtration, diluted with 400 ml. of water, and extracted with one-half volume of ether. The aqueous layer is extracted with one-half volume of ethyl acetate at pH 5.5. The ethyl acetate solution is washed with one-half volume of water, dried over anhydrous sodium sulfate, filtered and adjusted to pH 8 with 1 N methanolic KOH. The solution is evaporated to dryness, and the residue triturated with ether to give the potassium salt of 6-[(O-p-methoxyphenyl)benzenethionophosphonamido]penicillanic acid, which is dried further in vacuo over phosphorous pentoxide.

The following new penicillins are prepared in like manner from the appropriate phosphonyl chloride.

| X | $R_1$ | Y | $R_3$ |
|---|---|---|---|
| O | $ClCH_2-CH_2-CH_2$ | O | $ClCH_2CH_2CH_2$ |
| O | $ClCH_2-(CH_2)_5$ | O | $C_2H_5$ |
| O | $BrCH_2-CH_2$ | O | $BrCH_2-CH_2$ |
| O | $BrCH_2-(CH_2)_5$ | O | $C_2H_5$ |
| O | $(\beta-Cl)C_4H_8$ | O | $C_2H_5$ |
| O | $BrCH_2-(CH_2)_7$ | O | $CH_3$ |
| O | $C_2H_5O-CH_2-CH_2-CH_2$ | O | $C_2H_5OCH_2CH_2CH_2$ |
| O | $C_4H_9O-CH_2-CH_2$ | O | Phenyl |
| O | $CH_3O-(CH_2)_8$ | O | $CH_3$ |
| S | $CH_3O-CH_2CH_2$ | O | $CH_3OCH_2CH_2$ |
| O | Allyl | O | $C_6H_5$ |
| S | do | O | $C_6H_5$ |
| O | sec-$C_4H_9$ | O | $C_2H_5$ |
| O | $CH_3-CH(CH_3)-CH_2-CH_2$ | O | $C_2H_5$ |
| O | $C_6H_5$ | O | $NO_2CH_2CH_2$ |
| O | $C_6H_5$ | O | $\beta$-$(NO_2)C_4H_8$— |
| O | Allyl | | Allyl |
| O | $C_6H_5$ | O | p-$NO_2C_6H_4$ |
| O | $NO_2CH_2CH_2$ | O | $NO_2CH_2CH_2$ |
| O | $NO_2CH_2(CH_2)_7$ | O | $CH_3$ |

*Example II*

6-[(O-n-BUTYL)BENZENEPHOSPHONAMIDO] PENICILLANIC ACID

A solution of 6.99 g. of (O-n-butyl)benzenephosphonyl chloride in 45 ml. of acetone is added to a solution of 6.48 g. of 6-aminopenicillanic acid and 6.0 g. of potassium bicarbonate in 45 ml. of water. The solution (pH 4.8) is adjusted to pH 6 with 10% $KHCO_3$ solution and then agitated for 5 hrs. The reaction mixture is then extracted at pH 5.5 with two volumes of ethyl acetate.

The ethyl acetate extract is washed with one-half volume of water, dried over anhydrous sodium sulfate and adjusted to pH 8 with 1 N methanolic KOH. The solution is then evaporated to dryness to give the potassium salt of 6-[(O-n-butyl)benzenephosphonamido]penicillanic acid.

*Example III*

To a well-stirred suspension of 6-aminopenicillanic acid (18 g.) in 200 ml. of water there is added sufficient solid sodium bicarbonate to bring the pH to 7.5 and 400 ml. of acetone. A solution of (O-ethyl)isopropanephosphonyl chloride (12 g.) in 25 ml. of acetone is then added dropwise during 15 minutes at 0°–5° C. after which the mixture is stirred at room temperature for four hours. The pH is maintained at 7.5 throughout the reaction by the addition of sodium hydroxide.

The reaction mixture is extracted twice with ethyl acetate (300 ml.) to remove unreacted chloride. The aqueous phase is then adjusted to pH 2.5 with dilute hydrochloric acid, and extracted twice with one-half volume of n-butanol containing 5% hexane (by volume). The n-butanol-hexane extract is washed once with one-half volume of water and the water phase discarded. Water (175 ml.) is added to the n-butanol-hexane extract and the pH brought to 6.5 by the addition of 5 N potassium hydroxide. The aqueous phase is separated and the extraction with water (one-third volume) at pH 6.5 repeated. The combined aqueous extracts are washed with one-third volume of ether and freeze-dried to give the potassium salt of 6-[(O-ethyl)isopropanephosphonamido]penicillanic acid.

*Example IV*

Repetition of the procedure of Example I using 400 ml. of acetone-water (1–1) as solvent system for the 6-aminopenicillanic acid produces substantially the same results.

In like manner, the following 6-[phosphonamido]penicillanic acid potassium salts are prepared from the appropriate phosphonyl halide. For convenience only the R groups are listed:

| X | $R_1$ | Y | $R_3$ |
|---|---|---|---|
| O | $C_6H_5$ | O | $o\text{-}ClC_6H_4$ |
| O | $C_2H_5$ | O | $m\text{-}ClC_6H_4$ |
| O | $C_6H_5$ | O | $m\text{-}(CH_3)C_6H_4$ |
| O | $C_6H_5$ | O | $ClCH_2CH_2$ |
| S | $C_6H_5\text{-}O\text{-}CH_2$ | O | $CH_3$ |
| S | $C_6H_5$ | O | $C_2H_5$ |
| S | $C_6H_5$ | O | $n\text{-}C_3H_7$ |
| S | $C_6H_5$ | O | $i\text{-}C_3H_7$ |
| S | $C_6H_5S\text{-}CH_2$ | O | $CH_3$ |
| S | $C_6H_5$ | O | $n\text{-}C_6H_{13}$ |
| O | $C_2H_5$ | O | $n\text{-}C_8H_{17}$ |
| S | $C_6H_5$ | O | $p\text{-}(CH_3O)C_6H_4$ |
| S | $C_6H_5$ | O | $C_6H_5$ |
| S | $C_6H_5$ | O | $o\text{-}(CH_3)C_6H_4$ |
| S | $C_6H_5$ | O | $m\text{-}(CH_3)C_6H_4$ |
| S | $C_6H_5$ | O | $o\text{-}ClC_6H_4$ |
| S | $C_6H_5$ | O | $m\text{-}ClC_6H_4$ |
| S | $C_6H_5$ | S | $C_2H_5$ |
| S | $C_6H_5$ | S | $n\text{-}C_3H_7$ |
| O | $C_6H_5$ | O | $n\text{-}C_4H_9$ |
| S | $C_6H_5$ | S | $n\text{-}C_8H_{17}$ |
| S | $C_2H_5$ | S | $C_2H_5$ |
| S | $C_6H_{13}$ | S | $C_8H_{17}$ |
| S | $C_8H_{17}$ | S | $C_8H_{17}$ |
| O | $C_6H_5CH_2$ | O | $C_2H_5$ |
| O | $CH_3$ | O | $ClCH_2CH_2$ |
| O | $C_3H_7$ | O | $ClCH_2CH_2$ |
| O | $C_8H_{17}$ | O | $ClCH_2CH_2$ |
| O | $C_6H_5$ | O | $C_2H_5$ |
| O | $C_6H_5$ | O | $C_4H_9$ |
| O | $C_6H_5$ | O | $C_6H_{13}$ |
| S | $C_4H_9$ | S | $C_2H_5$ |
| S | $C_8H_{17}$ | S | $C_2H_5$ |
| S | $C_2H_5$ | S | $C_8H_{17}$ |
| S | $C_6H_5$ | O | $p\text{-}(C_2H_5O)C_6H_4$ |
| S | $C_6H_5$ | O | $p\text{-}(C_2H_5O)C_6H_4$ |
| O | $C_6H_5$ | O | $o\text{-}(C_2H_5O)C_6H_4$ |
| O | $C_6H_5$ | O | $C_2H_5$ |
| O | $C_6H_5$ | O | $CH_3$ |
| O | $C_6H_5$ | O | $C_6H_{13}$ |
| O | $p\text{-}NO_2C_6H_5$ | O | $C_2H_5$ |
| O | $p\text{-}NO_2C_6H_5$ | O | $C_6H_5$ |
| O | $i\text{-}C_3H_7$ |  | $C_6H_5$ |
| O | $i\text{-}C_3H_7$ |  | $CH_2C_6H_5$ |
| O, S | $C_5H_{11}$ |  | $C_2H_5$ |
| O, S | $C_7H_{15}$ |  | $C_2H_5$ |
| O | $C_2H_5$ |  | $C_5H_{11}$ |

*Example V*

The procedure of Example III is repeated but using (o-ethyl)isopropanephosphonyl bromide in place of (o-ethyl)isopropanephosphonyl chloride. Sodium hydroxide is used as neutralizing agent in the aqueous extraction of the product from the n-butanol-hexane extract to give the sodium salt of 6-[(o-ethyl)isopropanephosphonamido]penicillanic acid.

In like manner the following products are prepared from the appropriate phosphonyl halide. For convenience only the variable-terms are listed.

| X | $R_1$ | Y | $R_3$ |
|---|---|---|---|
| O | $C_6H_5$ | O | $NO_2CH_2CH_2$ |
| O | $C_2H_5$ | O | $C_2H_5$ |
| S | $C_6H_{11}$ | O | $C_6H_5$ |
| O | $C_6H_{11}$ | O | $C_2H_5$ |
| O | $C_4H_9$ | O | $C_2H_5$ |
| O | $C_6H_{13}$ | O | $C_2H_5$ |
| O | $C_8H_{17}$ | O | $C_2H_5$ |
| O | $C_4H_9$ | O | $C_6H_5$ |
| O | $C_6H_5$ | O | $BrCH_2CH_2$ |
| O | $C_6H_5$ | O | $CH_2C_6H_5$ |
| S | $C_6H_5$ | O | $CH_2C_6H_5$ |
| O | $C_6H_5$ | O | Allyl |
| O | $C_6H_5$ | O | $o\text{-}(C_4H_9O)C_6H_4$ |
| S | $C_6H_5$ | O | $o\text{-}(C_4H_9O)C_6H_4$ |
| O | $C_6H_5$ | O | $p\text{-}(t\text{-}C_4H_9)C_6H_4$ |
| O | $C_6H_4$ | O | $o\text{-}BrC_6H_4$ |
| S | $o\text{-}ClC_6H_4$ | O | $C_2H_5$ |
| O | $i\text{-}C_3H_7$ | S | $C_2H_5$ |
| O | $o\text{-}(CH_3O)C_6H_4$ | S | $C_2H_5$ |
| S | $ClCH_2CH_2$ | S | $C_6H_5$ |
| O | $C_6H_5$ | O | $CH_3OC_2H_4\text{—}$ |
| O | $C_6H_5$ | O | $C_4H_9OC_8H_{15}$ |
| O | $CH_3OC_2H_4$ | O | $C_2H_5$ |
| O | $C_6H_5$ | O | $C_9H_5$ |
| O | $C_6H_5$ | O | $m\text{-}(CH_3O)C_6H_4$ |
| O | $C_6H_5$ | O | $p\text{-}(CH_3)C_6H_5$ |
| O | $C_6H_5$ | O | $o\text{-}(CH_3)C_6H_4$ |
| O | $C_6H_5$ | O | $p\text{-}(CH_3O)C_6H_4$ |

*Example VI*

Following the procedure of Example I, the following new penicillins are prepared. The listing of both O and S under X indicates both the phosphonyl and thionophosphonyl derivatives are prepared.

| X | $R_1$ | $R_2$ |
|---|---|---|
| O, S | $C_6H_5$ | $C_2H_5$ |
| O, S | $CH_3$ | $CH_3$ |
| O, S | $CH_3$ | $C_2H_5$ |
| O, S | $C_2H_5$ | $C_2H_5$ |
| O | $C_3H_7$ | $C_2H_7$ |
| O, S | $C_4H_9$ | $C_4H_9$ |
| O, S | $C_6H_5$ | $CH_3$ |
| O, S | $C_6H_5$ | $C_6H_5$ |
| O | $C_8H_{17}$ | $C_8H_{17}$ |
| O | $ClCH_2CH_2$ | $ClCH_2CH_2$ |
| O | $C_6H_{11}$ | $C_6H_{11}$ |
| O | $CH_2C_6H_5$ | $CH_2C_6H_5$ |
| O, S | $o\text{-}ClC_6H_4$ | $o\text{-}ClC_6H_4$ |
| O, S | $p\text{-}NO_2C_6H_4$ | $p\text{-}NO_2C_6H_4$ |
| O, S | Allyl | Allyl |
| O, S | $p\text{-}ClC_6H_4$ | $p\text{-}ClC_6H_4$ |
| O, S | $p\text{-}(CH_3)C_6H_4$ | $C_6H_5$ |
| O, S | $o\text{-}(CH_3)C_6H_4$ | $o\text{-}(CH_3)C_6H_3$ |
| O, S | $p\text{-}(CH_3)C_6H_4$ | $p\text{-}(CH_3)C_6H_4$ |
| O | $p\text{-}(CH_3O)C_6H_4$ | $p\text{-}(CH_3O)C_6H_4$ |
| O | $C_2H_5OC_2H_4$ | $C_2H_5OC_2H_4$ |
| O | $o\text{-}BrC_6H_4$ | $o\text{-}BrC_6H_4$ |
| O | $p\text{-}(t\text{-}C_4H_9)C_6H_4$ | $p\text{-}(t\text{-}C_4H_9)C_6H_4$ |
| O | $p\text{-}(C_4H_9O)C_6H_4$ | $p\text{-}(C_4H_9O)C_6H_4$ |
| O | $C_6H_5OCH_2$ | $C_6H_5OCH_2$ |
| O | $C_6H_5SCH_2$ | $C_6H_5SCH_2$ |
| O | $ClCH_2(CH_2)_3$ | $ClCH_2CH_2$ |

*Example VII*

The products of the preceding examples are converted to their free acid form by acidification of an aqueous solution of the potassium salts to pH 2.5 with hydrochloric acid. The acids are extracted from aqueous solution with ether, the ether solution dried and the acids recovered by evaporation.

*Example VIII*

The sodium, calcium and ammonium salts of the products of Example VII are prepared by neutralizing a suspension of the appropriate acid (0.001 mole) in 20 ml. of water with an equimolar quantity of sodium, calcium or ammonium hydroxide. The salts are isolated by freeze drying.

Example IX

To 0.001 mole of each of the products of Example VII in 10 ml. of methylisobutylketone there is added 0.001 mole of N,N'-dibenzylethylenediamine in 10 ml. of isopropanol and the mixture thoroughly stirred. After 4 hours, the product is recovered by filtration, washed with ether and dried.

In like manner, the following amine salts of the products of Example VII are prepared:

Procaine
Dibenzylamine
l-Ephenamine
N-benzyl-β-phenethylamine

Example X

To 0.001 mole of each of the products of Examples II, III and IV in 10 ml. of water there is added 0.001 mole of procaine hydrochloride in 20 ml. of water. The product precipitates and is recovered by filtration, washed with cold water and dried.

Example XI

RESISTANCE TO PENICILLINASE

6 - [(O - phenyl)benzenethionophosphonamido]penicillanic acid is tested for penicillinase resistance essentially according to the basic technique of Gots, Science 102, 309 (1945), which comprises incorporating a sensitive *S. aureus* strain into a brain-heart medium with the antibiotic to be tested. Upon incubation under standard conditions no growth occurs.

The process is repeated, this time placing penicillinase on the surface of the medium and the medium incubated as before. In the case of a penicillinase resistant antibiotic no zone of growth occurs whereas if the antibiotic is sensitive to penicillinase, a zone of growth occurs. By using known amounts of the antibiotic to be tested and known amounts of penicillinase, the resistance of the antibiotic to penicillinase, relative to that of benzylpenicillin as standard, is determined. In this manner, a value "K" defined as $$K = \frac{\text{zone size against benzylpenicillin}}{\text{zone size against experimental penicillin}}$$

is obtained. Values of K equal to or greater than 1 indicate resistance to penicillinase. When the denominator is zero, that is, when no zone of growth occurs, $K \gg 1$ and the experimental antibiotic is completely resistant to penicillinase.

6 - [(O - phenyl)benzenethionophosphonamido]penicillanic acid is thus found to be completely resistant to penicillinase.

Similarly the remaining products of the preceding examples are found to possess resistance to penicillinase to a varying degree in having K values greater than 1.

What is claimed is:
1. A compound selected from the group consisting of those having the formula:

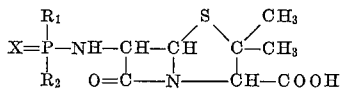

and the pharmacologically acceptable salts thereof wherein X is selected from the group consisting of oxygen and sulfur; $R_1$ is selected from the group consisting of cyclohexyl, phenoxymethyl, phenylmercaptomethyl, alkyl of from 1 to 8 carbon atoms, substituted alkyl wherein the substituent is selected from the group consisting of chloro, bromo, nitro and alkoxy of from 1 to 4 carbon atoms; benzyl, allyl, phenyl, substituted phenyl wherein the substituent is selected from the group consisting of chloro, bromo, nitro and alkoxy of from 1 to 4 carbon atoms and alkyl of from 1 to 4 carbon atoms; $R_2$ is selected from the group consisting of $R_1$ and $YR_3$ wherein Y is selected from the group consisting of oxygen and sulfur; $R_3$ is selected from the group consisting of allyl, benzyl, phenyl, substituted phenyl wherein the substituent is selected from the group consisting of chloro, bromo, nitro and alkoxy of from 1 to 4 carbon atoms and alkyl containing 1 to 4 carbon atoms; alkyl of from 1 to 8 carbon atoms and substituted alkyl wherein the substituent is selected from the group consisting of chloro, bromo, nitro and alkoxy of from 1 to 4 carbon atoms.

2. 6 - [(O-ethyl)isopropanephosphonamido]penicillanic acid.

3. 6 - [(O-ethyl)isopropanephosphonamido]penicillanic acid potassium salt.

4. 6 - [(O-β-chloroethyl)benzenephosphonamido]penicillanic acid potassium salt.

5. 6 - [(O - o - chlorophenyl)benzenephosphonamido]penicillanic acid.

6. 6 - [(O-ethyl)benzenethionophosphonamido]penicillanic acid sodium salt.

7. 6-[di-n-butylphosphonamido]penicillanic acid potassium salt.

8. 6-[di-ethylphosphonamido]penicillanic acid potassium salt.

9. 6 - [(O - o - tolyl)benzenephosphonamido]penicillanic acid.

10. 6 - [(O-phenyl)benzenethionophosphonamido]penicillanic acid.

References Cited in the file of this patent
UNITED STATES PATENTS
2,941,995     Doyle et al. _____ June 21, 1960

FOREIGN PATENTS
569,728     Belgium _____ Nov. 15, 1958

OTHER REFERENCES
Morton: The Chemistry of Heterocyclic Compounds, page VI of the preface (1946).